May 7, 1957 J. PIGEON 2,791,556
APPARATUS FOR RECOVERING OF SILVER FROM PHOTOGRAPHIC
PROCESSING BATHS
Filed Dec. 13, 1954
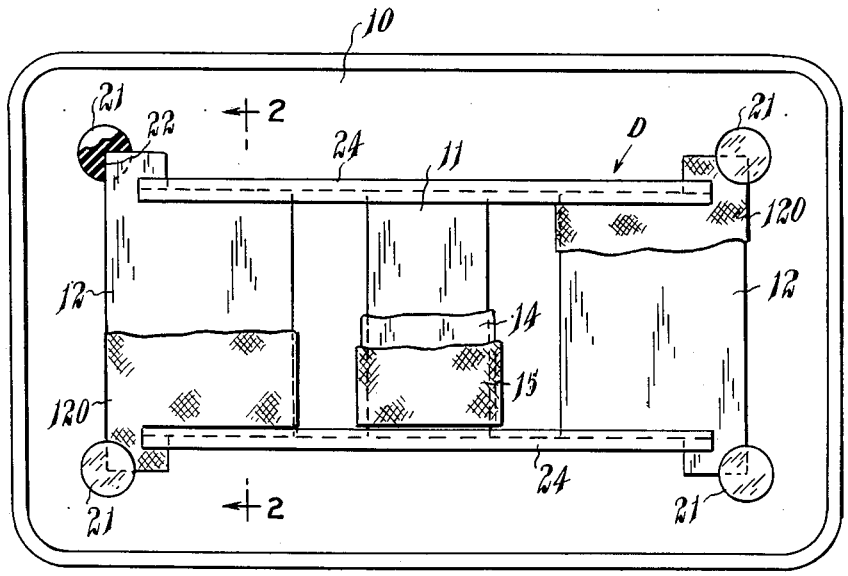
Fig. 1.
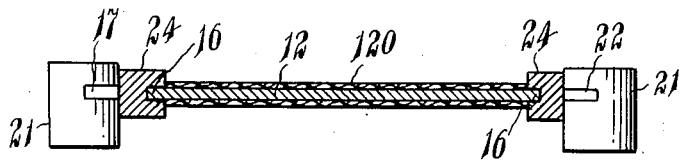
Fig. 2.
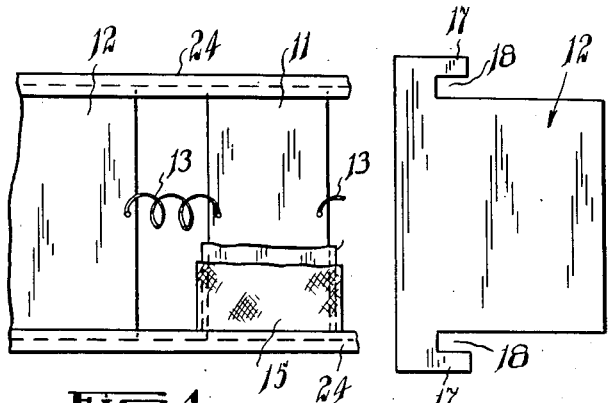
Fig. 3.
Fig. 4.
INVENTOR
JEAN PIGEON
BY Frederick C. Bromley
ATTY.

United States Patent Office 2,791,556
Patented May 7, 1957

2,791,556
APPARATUS FOR RECOVERING OF SILVER FROM PHOTOGRAPHIC PROCESSING BATHS

Jean Pigeon, Blind River, Ontario, Canada

Application December 13, 1954, Serial No. 474,810

7 Claims. (Cl. 204—248)

This invention relates to apparatus for recovering silver from photographic processing baths.

In the process of clearing a film, plate or photographic paper, after exposure has been made, silver is dissolved out of the emulsion, the silver passing into the solution of "hypo" clearing bath or "hypo" solution. The silver can be recovered from the "hypo" solution by precipitation, usually as a chloride, and is sold as such.

As is well known, if two dissimilar metals are coupled together and placed in an electrolyte, an electromotive force is developed; the metal which is the more active electrochemically becomes the positive or anode, while the less active electrochemically becomes the negative or cathode, current flowing from the anode to the cathode. By coupling two metals having different values or positions in the electrochemical series and immersing these two metals in a spent "hypo" bath, current flows from one metal, as anode, to the other metal, as cathode, and metallic silver is deposited upon the cathode.

Apparatus embodying the above principle have been proposed for the purpose of depositing and collecting silver, but as in all such prior apparatus, the silver is deposited in finely-divided form, some of which goes to the anode and part of which falls in the hypo tank; also the salts produced by the reaction of the solution on the anode go into the "hypo" solution. Thus, apparatus of the prior art are not satisfactory.

Moreover the most serious difficulty encountered with prior art devices is actually that the silver deposit forms around the anode and eventually chokes off the access of the solution and the reaction. It is therefore the primary aim of the present invention to overcome the difficulty.

Other objects of the invention, generally, are to provide an improved apparatus for the recovery of silver from a "hypo" clearing bath or "hypo" solution.

A specific object of the invention is to provide a useful and efficient apparatus which, when immersed in a spent photographic "hypo" solution, will bring about the deposition of dense metallic silver, in contrast to the loose powdery deposits obtained by other apparatus.

Another specific object of the invention is to provide an apparatus by which silver, in a spent "hypo" solution, is deposited upon a surface (or surfaces) constituting a cathode (or cathodes) in the form of a dense deposit, when immersed in a spent "hypo" solution.

Another specific object of the invention is to provide such an apparatus, in which the cathode can be conveniently cleaned or cleared of the deposited silver, as by scraping.

Still another specific object of the invention is to provide such an apparatus, substantially in the form of a flat straight assembled unit, in which the anode and the cathodes are easily applied to and as easily removed from side members, and is well adapted to be immersed into the conventional shallow "hypo" bath or tray.

In the drawing, wherein is shown the preferred form of the invention, and wherein like numerals of reference indicate corresponding parts of the various figures:

Figure 1 is a plan view of the device, lying upon the bottom of a conventional "hypo" bath or tray;

Figure 2 is a section on line 2—2 of Figure 1 on an enlarged scale;

Figure 3 is a plan view of one of the cathodes; and

Figure 4 is a modification.

Referring now by numerals to the drawing, 10 shows a typical or conventional pan or tray used in developing photographic negatives or in clearing negatives. D shows the device of the invention, in its entirety.

11 is a flat plate, say of zinc, adapted to serve as an anode. 12 are two plates of similar metal, say silver, adapted to serve as cathodes. As zinc is more active electrochemically than silver, current flows between the zinc plate, as anode, and the silver plates, as cathodes, if the cathodes and anode are immersed in an electrolyte—the spent "hypo" solution used in developing or clearing a photographic negative. The anode is coupled or connected to the cathodes by metallic side members 24, to be referred to.

Preferably, the anode is covered or wrapped in oiled paper 14 which should be of a porous nature, and a gauze 15 which has been impregnated with paraffin to a degree just sufficient to keep it porous. This covering of the anode serves two purposes: first, to slow up the electrolytic reaction by reduction of current density, and secondly, to catch the insoluble salts of the anode which are formed as a result of the electrolytic reaction in the "hypo" solution. The cathodes should have a greater area than the anode—preferably—in the proportion of three to one (3 to 1).

Additionally, each cathode should have a wrapping of gauze to prevent the metallic deposit from falling off. This wrapping need only be sufficient to provide a thin layer around the cathode, as designated at 120 in Figure 1.

The plates are held in spaced, longitudinal relationship by rigid, straight, metallic side members, in the form of channels 24, presenting grooves 16 into which opposite edges of the plates are received.

As a modified form, the side members may be made of strips of wood impregnated with wax, or made of plastic in which case the anode is coupled or connected to the cathodes as by wires 13, preferably in the form of coils, as shown in the full lines in Figure 4.

The anode is rectangular in plan, while the cathodes are preferably made as shown in Figure 3, that is, formed adjacent one transverse, longer edge with extensions or portions 17 in part cut away as by recesses 18. The width of the recess 18 is slightly more than the width of the web 20 of the channel member, so that when the two cathodes are assembled to the side supporting members, with the inner ends of the recesses 18 abutting the ends of the supporting members, the cathodes are held fairly securely in position and assembled to the side members.

Preferably, as shown, the complete unit, including anode, cathodes and side supporting members, is held above the surface of the bottom of the tray 10 as by feet or legs in the form of cylindrical members 21, the members being formed with 90° segmental slots 22 into which two opposite corners of the cathodes are received.

Said supporting members 21 are necessarily made of non-conducting material to obviate electric contact with the metal tank which, for instance, may be of stainless steel. Further the supporting members are required to be coated with a substance capable of preventing deposition of silver on the surface. In practice the supporting members or feet are made of rubber and coated with paraffin for the purpose just mentioned. The rubber feet are slit and slipped over corners of the cathodes.

To use the device, the several parts are assembled together, as shown in Figure 1. The assembled device or unit is immersed into the "hypo" bath. Current flows from the anode (plate 11) to the cathodes (12—12) and silver is deposited upon the cathodes. When the silver is to be removed from the cathodes, as by scraping or scaling off, the device is taken out of the bath, and the plates disassembled from the supports or members 24.

What I claim is:

1. A self-contained apparatus to be used for the electro-deposition of silver contained in a "hypo" solution, comprising a pair of rigid, rectilinear members each channelled to present a longitudinal groove, a metal plate engaged in the grooves of said members, respectively, intermediate the length thereof and a pair of substantially rectangular metal plates electrically connected to said first plate and spaced therefrom and having opposite edges received in the grooves of said members so that all of said plates lie in a common plane, the metal of said pair of plates being less active electrochemically than the metal of said first plate, and the whole forming a shallow self-contained unit adapted to be immersed into the "hypo" solution.

2. A self-contained apparatus to be used for the electro-deposition of silver contained in a "hypo" solution, comprising a pair of substantially rectangular metal plates formed on laterally opposite corners with extensions in part defined by recesses, a pair of rigid, rectilinear, members each formed with a longitudinal groove, said plates being removably assembled to said members with opposite edges of said plates engaged in the grooves of said members, respectively, and with the ends of said members engaged in said recesses, respectively, and a metal plate carried by said members intermediate of the length thereof and electrically connected to said pair of plates, the metal of said pair of plates being less active electrochemically than the metal of said last-mentioned plate, the whole forming a shallow self-contained unit adapted to be immersed into the "hypo" solution.

3. Apparatus as in claim 1, wherein said pair of members are made of metal.

4. Apparatus as in claim 1, wherein said pair of members are non-conductors and said metal plate is electrically connected to said pair of metal plates by conductors.

5. Apparatus as in claim 1, wherein said pair of members are non-conductors and said metal plate is connected to said pair of plates by coiled conductors.

6. A self-contained apparatus to be used for the electro-deposition of silver contained in a "hypo" solution, comprising a pair of substantially rectangular metal plates formed on laterally-opposite corners with extensions in part defined by recesses, a pair of rigid, rectilinear, members each formed with a longitudinal groove, said plates being removably frictionally assembled to said members with opposite edges of said plates engaged in the grooves of said members, respectively, and with the ends of said members frictionally engaged in said recesses, respectively, a metal plate having opposite parallel edges engaged in the grooves of said members intermediate said pair of plates and electrically connected thereto, the metal of said pair of plates being less active electro-chemically than the metal of said last-mentioned plate, and means adapted to support the unit comprising paraffin-coated rubber feet formed with separate recesses frictionally engaged by outer corners of said pair of plates, respectively.

7. Apparatus as in claim 1, in which said first plate is substantially covered with an inner wrapping and an outer wrapping, said inner wrapping comprising an oiled paper of a porous character, and said outer wrapping comprising a gauze which remains porous and is impregnated with paraffin.

References Cited in the file of this patent

UNITED STATES PATENTS

| 951,372 | Judd | Mar. 8, 1910 |
| 1,629,212 | Giffin | May 17, 1927 |

FOREIGN PATENTS

| 493,415 | Great Britain | Oct. 7, 1938 |
| 750,407 | France | May 22, 1933 |